VOLTAGE ACCUMULATOR CIRCUIT

Filed Sept. 6, 1961

INVENTORS
ENRICO J. GALLI
GEORGE R. WHITE
BY
[signature]
ATTORNEY

United States Patent Office 3,079,086
Patented Feb. 26, 1963

3,079,086

VOLTAGE ACCUMULATOR CIRCUIT

Enrico J. Galli, Yorktown Heights, and George R. White, Glen Cove, N.Y., assignors to Sperry Rand Corporation, a corporation of Delaware Filed Sept. 6, 1961, Ser. No. 136,338
7 Claims. (Cl. 235—193)

This invention relates to voltage accumulator circuits for accumulating a voltage representing the sum of successively received input voltages, and more particularly relates to such a circuit whose output voltage is substantially independent of the time interval during which the successive input voltages are applied, and substantially independent of the characteristics of the circuit components used.

Voltage accumulator circuits of the type of this invention are useful in analog computors, for example, for continuously presenting the accumulated sum of a sequentially sampled voltage, or voltages, wherein the input voltage, or voltages, may be of different magnitude and polarity on successive sampling periods. Circuits for performing this function are well-known, an example of a commonly employed type being described in U.S. Patent 2,789,761. These circuits employ a direct-coupled (D.C.), high-gain amplifier with a negative feedback loop comprised of a capacitor coupled between the output and input of the amplifier. This type of an arrangement is commonly called an operational amplifier, and a number of variations of this circuit are known. Because of the integrating operation performed by these known circuits, the output voltage is dependent upon the time interval during which each successive input voltage is applied to the input of the amplifier, and upon the characteristics of the components forming the integrating circuit. The obvious disadvantage of this type of integrating summation circuit is that close control is required in the time of application of the sampled voltages to the input of the amplifier, and of the values of the circuit components.

It therefore is an object of this invention to overcome the above-described disadvantages of known voltage accumulator circuits.

A further object of this invention is to provide a circuit for accumulating the sum of successively applied voltages, wherein the operation of the circuit is substantially independent of the time duration during which the input voltages are applied.

Another object of this invention is to provide a non-integrating voltage accumulator circuit.

These and other objects of the invention, which will become more apparent from the description and claims below, are achieved by providing a high-gain, direct-coupled amplifier having first and second capacitors coupled to its output and providing means for alternately connecting said capacitors to the input of said amplifier during successive switching intervals, and for alternately connecting said capacitors to an input terminal receiving successively sampled voltages, for example, during alternate successively switching intervals. In this manner, during a first switching interval the first one of said capacitors is being charged by a voltage coupled from said input terminal and the second of said capacitors is connected in a feedback loop from the output to the input of said amplifier. The first, or charging capacitor is charging to a potential substantially equal to the difference between the sampled input voltage and the output voltage of said amplifier. During the next succeeding switching interval the circuit connection and performance of the two capacitors is interchanged so that the input to the amplifier now is the voltage across the previous charging capacitor and the present output of the amplifier is equal to the negative of the previous voltage on this capacitor.

The capacitor which now is connected to the input terminal is charged to a potential equal to the difference between the present sampled input voltage and the present output of the amplifier. During successive switching intervals the circuit continues to operate in this manner so that the capacitor connected to the input circuit always charges to a potential equal to the difference between the present sampled input voltage and the present output of the amplifier, i.e. the summation of the present input and all previously received inputs, and upon the occurrence of the next switching interval this potential is applied to the input of the amplifier.

As distinguished from the prior art integrating accumulator circuits described above, the accumulator circuit of this invention does not perform an integrating function and its output is not dependent upon the time duration during which signals are applied to the input of the amplifier. The operation of the accumulator circuit of this invention can be considered analogous to a situation wherein batteries of different voltages are applied to the amplifier during each successive switching interval; the voltage of a battery being equal to the voltage on the capacitor in the feedback loop, i.e., the summation of all previous successively received input voltages.

The present invention will be explained by referring to the accompanying drawings wherein.

Figure 1:
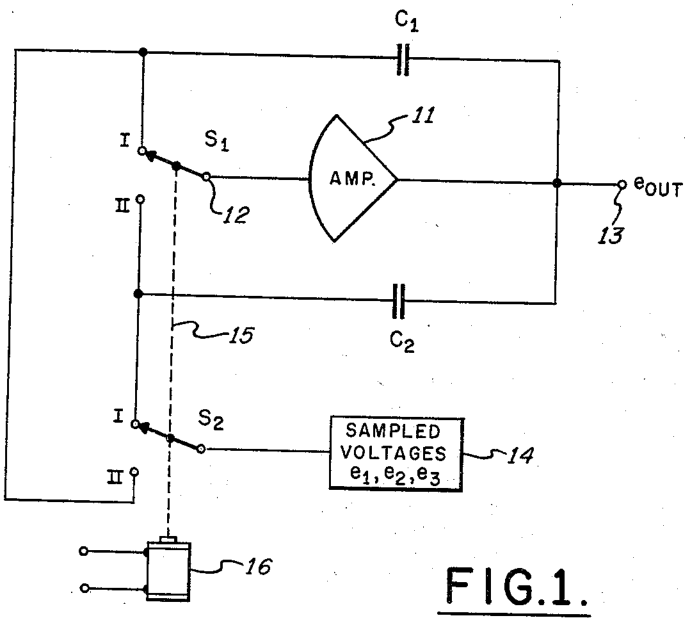
FIG. 1 is a simplified schematic diagram partially in block form, illustrating the voltage accumulator circuit of this invention.

Referring now more particularly to FIG. 1, the voltage accumulator circuit of this invention is comprised of a high-gain D.C. amplifier 11 whose input terminal 12 is coupled to the armature of single-pole double-throw switch $s_1$, and whose output is coupled to output terminal 13. Capacitors $c_1$ and $c_2$ each have one terminal coupled to the output of amplifier 11, and the other terminals of said capacitors are coupled respectively to contact I and II of switch $s_1$. Input voltages, which may be successively sampled voltages $e_1$, $e_2$, and $e_3$ from a voltage source 14, are coupled to the armature of single-pole double-throw switch $s_2$. Switches $s_1$ and $s_2$ operate in synchronism by means of a mechanical linkage 15 and an actuating winding 16 which in turn may operate in synchronism with the sampling of the input voltage source 14. That is, each successive sampled voltage will be coupled to alternate contacts of switch $s_2$.

When switches $s_1$ and $s_2$ are closed on their I contacts, a sample voltage from source 14 is coupled only to capacitor $c_2$, and capacitor $c_1$ is coupled in a feedback loop between the output and the input of amplifier 11. When switches $s_1$ and $s_2$ are closed on their II contacts, the connections of capacitors $c_1$ and $c_2$ are interchanged so that capacitor $c_1$ now is coupled to receive a sampled voltage from source 14 and capacitor $c_2$ is coupled in the feedback loop between the output and the input of D.C. amplifier 11.

The operation of high gain D.C. amplifier 11 with a capacitor in its feedback loop may be explained as follows:

The voltage on the input terminal of the amplifier, the grid of a vacuum tube for example, is $$e_{in} = -Vc\left(\frac{1}{a+1}\right) \qquad (1)$$

where Vc is the voltage stored in the capacitor in the feedback loop, and "$a$" is the gain of the amplifier. The voltage on the output terminal of the amplifier is $$e_{out} = Vc\left(\frac{a}{a+1}\right) \qquad (2)$$

Because the gain "$a$" is very large, the term within the parentheses in Equation 1 will be very small, indicating that the voltage $e_{in}$ on the grid of the amplifier will remain substantially at ground potential irrespective of the voltage stored in the capacitor. Referring to Equation 2 it will be seen that because "$a$" is very large the term within the parentheses will have a value substantially equal to one. This indicates that the output voltage of the amplifier is substantially equal to the voltage Vc stored in the capacitor in the feedback loop.

In the operation of the voltage accumulator circuit of FIG. 1, it will be assumed that voltage source 14 will produce successively occurring sampled voltage $e_1$, $e_2$, $e_3$, etc., wherein each of these voltages is at a fixed level throughout its respective switching interval. Voltage source 14 may, for example, be a rotary switch whose plurality of contacts are coupled to various sampling points in a circuit. It further will be assumed that the capacitors $c_1$ and $c_2$ initially are completely discharged. During the first switching interval switches $s_1$ and $s_2$ are closed on their I contacts and the sampled voltage $e_1$ is coupled from source 14 through switch $s_2$ and charges capacitor $c_2$. Because capacitor $c_1$ is in the feedback loop between the output and input of D.C. amplifier 11 and is not charged, there is no input voltage applied to amplifier 11. Consequently, the output voltage therefrom is zero. Capacitor $c_2$ therefore charges to the potential $e_1$. On the next succeeding switching interval switches $s_1$ and $s_2$ are closed on their II contacts and a sampled voltage $e_2$ is coupled through switch $s_2$ to one terminal of capacitor $c_1$. Capacitor $c_2$ now is coupled through switch $s_1$ to the input of D.C. amplifier 11, and the output of said amplifier is substantially equal to $-e_1$. The potential difference across capacitor $c_1$ now is the difference between the potentials on its respective terminals, that is, $e_2-(-e_1)$, or $(e_2+e_1)$. On the next switching interval, switches $s_1$ and $s_2$ closed on their I contacts and the sampled voltage $e_3$ is coupled through switch $s_2$ to one terminal of capacitor $c_2$. The potential on capacitor $c_1$, $(e_2+e_1)$, now is applied to D.C. amplifier 11, and its output voltage becomes $(-e_2-e_1)$. The potential across capacitor $c_2$ is the difference between the potential on its two terminals $e_3-(-e_2-e_1)$, or $(e_3+e_2+e_1)$.

It thus may be seen that on each successive switching interval the capacitor coupled to voltage source 14 charges to a potential equal to the sum of the presently sampled voltage and the accumulated sum of the previously sampled voltage, and that this accumulated voltage is applied to the D.C. amplifier 11 on the next succeeding interval so that the output of said amplifier is the negative of this accumulated voltage.

Figure 2:
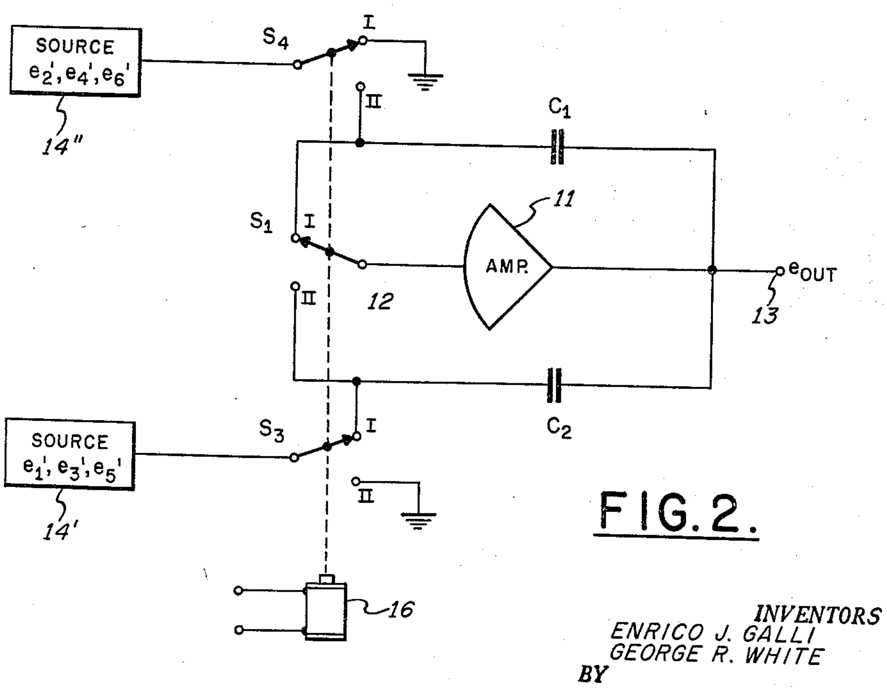
FIG. 2 is an alternative embodiment of the present invention illustrating a different arrangement of sampled voltage sources.

It will be obvious to those skilled in the art that different switching arrangements may be provided for accomplishing the same results as just described. Additionally, the voltage accumulator circuit of FIG. 1 will operate in an identical manner with different arrangements of input voltages applied thereto. In FIG. 2 for example, two different voltage sources 14' and 14'' are provided and are alternately connected to their respective capacitors $c_1$ and $c_2$ on successive switching intervals through the respective switches $s_3$ and $s_4$. Comparing FIGS. 1 and 2 it will be seen that contact I of switch $s_3$ and contact II of switch $s_4$ correspond to contacts I and II of switch $s_2$ FIG. 1, so that the only difference in the two circuits is that in FIG. 2 each capacitor is connected to a respective voltage source on alternate switching intervals rather than the two capacitors alternating between the same voltage source 14 as in FIG. 1.

It should be understood that in both the illustrated embodiments the voltage sources 14, 14' and 14'' may be substantially any type of voltage source and need not be stepping switches as assumed in the discussion. The voltages may be continuously changing, discretely changing, or steady state voltages, and they may be from a single source or from a plurality of sources. It also is to be understood that the input voltages in the circuits illustrated may be comprised of both positive and negative voltages, and the changes, if any, between successively sampled voltages may be either increasing or decreasing.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A voltage accumulator circuit comprising a high-gain direct-coupled amplifier, first and second capacitors each having one terminal thereof directly connected to the output of said amplifier, switching means for coupling the input of said amplifier to alternate ones of the other terminals of said capacitors on successive switching intervals, and means operable on alternate ones of said capacitors during successive switching intervals for charging the respective capacitor to a voltage substantially proportional to the sum of previously sampled voltages and a presently sampled voltage coupled to the other terminal of the respective capacitor, said capacitors being respectively charged and coupled to the input of said amplifier on alternate successive switching intervals.

2. A voltage accumulating circuit comprising a high-gain direct-coupled amplifier, first and second capacitors each having one terminal directly coupled to the output of said amplifier, a first switching means for alternately connecting the other terminal of the first one of said capacitors between the input of said amplifier and an input terminal, and a second switching means for alternately connecting the other terminal of the second one of said capacitors between the input of said amplifier and an input terminal, said two switching means operating in synchronism and alternately connecting said two capacitors to the input of said amplifier.

3. An analog accumulator circuit comprising a high-gain direct-coupled amplifier, first and second capacitors each having one terminal thereof directly connected to the output of said amplifier; means for alternately coupling the other terminal of the first one of said capacitors between the input of said amplifier and a sampled voltage during successive switching intervals, means for alternately coupling the other terminal of the second one of said capacitors between the input terminal of said amplifier and a sampled voltage during successive switching intervals, alternate ones of said capacitors being coupled to the input of said amplifier on successive switching intervals.

4. A voltage accumulating circuit comprising a high-gain direct-coupled amplifier, first and second capacitors each having one terminal thereof directly coupled to the output of said amplifier, switching means for alternately coupling the other terminal of the first of said capacitors between a charging voltage and the input of said amplifier and for alternately coupling the other terminal of said second capacitor between a charging voltage and the input of said amplifier, said switching means operating to switch said capacitors in synchronism and to alternately connect said capacitors to the input of said amplifier.

5. A voltage accumulating circuit comprising a high-gain direct-coupled amplifier, first and second capacitors each having one side directly coupled to the output of said amplifier, switching means for alternately connecting the other side of the first one of said capacitors between an input terminal and the input of said amplifier and for alternately connecting the other side of the second one of said capacitors between said input terminal and the input of said amplifier, said switching means operating to switch said capacitors in synchronism and to alternately connect said two capacitors to said input terminal.

6. An analog accumulator circuit comprising a high-gain direct-coupled amplifier, first and second capacitors each having one terminal thereof directly connected to the output of said amplifier, switching means for alternately connecting the other terminal of the first of said capacitors to the input of said amplifier and to an input terminal during successive switching periods and for alternately connecting the other terminal of said second capacitor to the input of said amplifier and to said input terminal on alternate successive switching periods.

7. A voltage accumulator circuit comprising a high-gain direct-coupled amplifier, first and second capacitors each having one terminal thereof directly connected to the output of said amplifier, and switching means for alternately connecting the other terminals of said capacitors to the input of said amplifier during successive switching intervals and for connecting the other terminals of said capacitors to respective voltage sources during alternate switching intervals, the other terminal of the first one of said capacitors being alternately connected between the input to said amplifier and the first one of said voltage sources during successive switching intervals.

References Cited in the file of this patent

UNITED STATES PATENTS

| | | |
|---|---|---|
| 2,789,761 | Merrill et al. | Apr. 23, 1957 |
| 2,914,750 | Cook | Nov. 24, 1959 |
| 2,950,052 | Knox | Aug. 23, 1960 |
| 2,985,838 | Cole et al. | May 23, 1961 |